April 13, 1943.  W. J. BIGLEY, JR  2,316,662
TANK
Filed Dec. 31, 1941  3 Sheets-Sheet 1
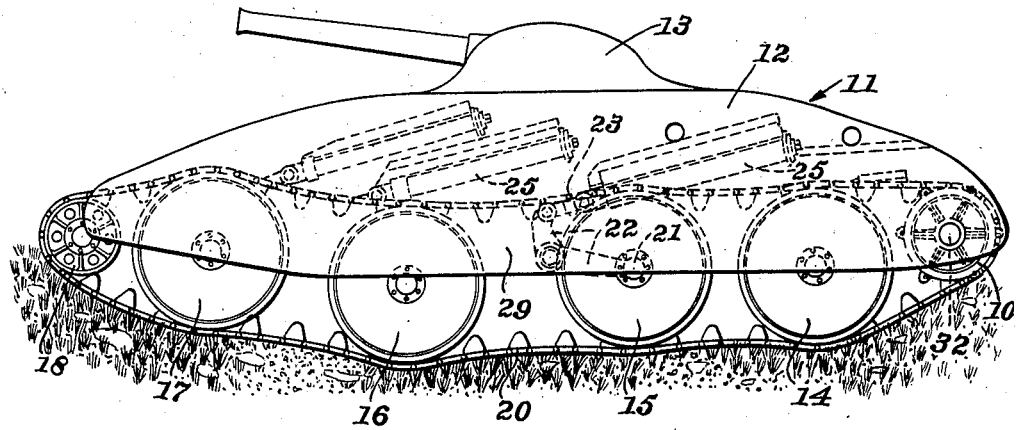
Fig. 1.
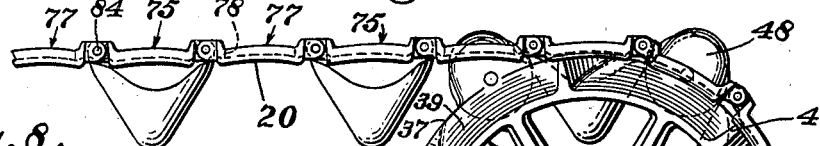
Fig. 2.
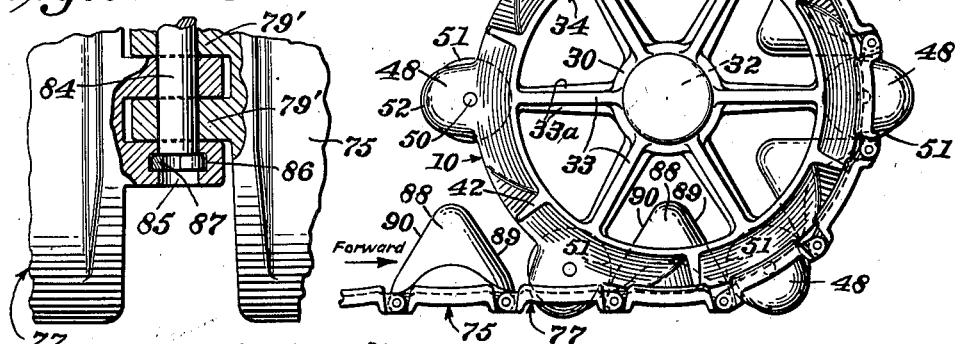
Fig. 8.
Fig. 7.
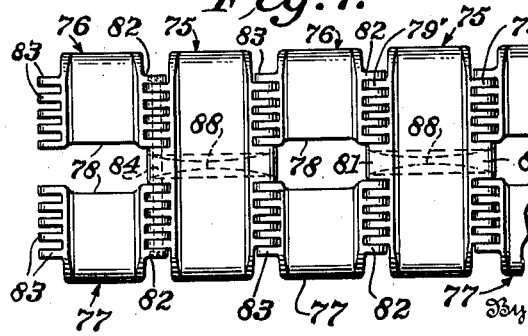
Fig. 9.
Inventor:
William J. Bigley, Jr.,

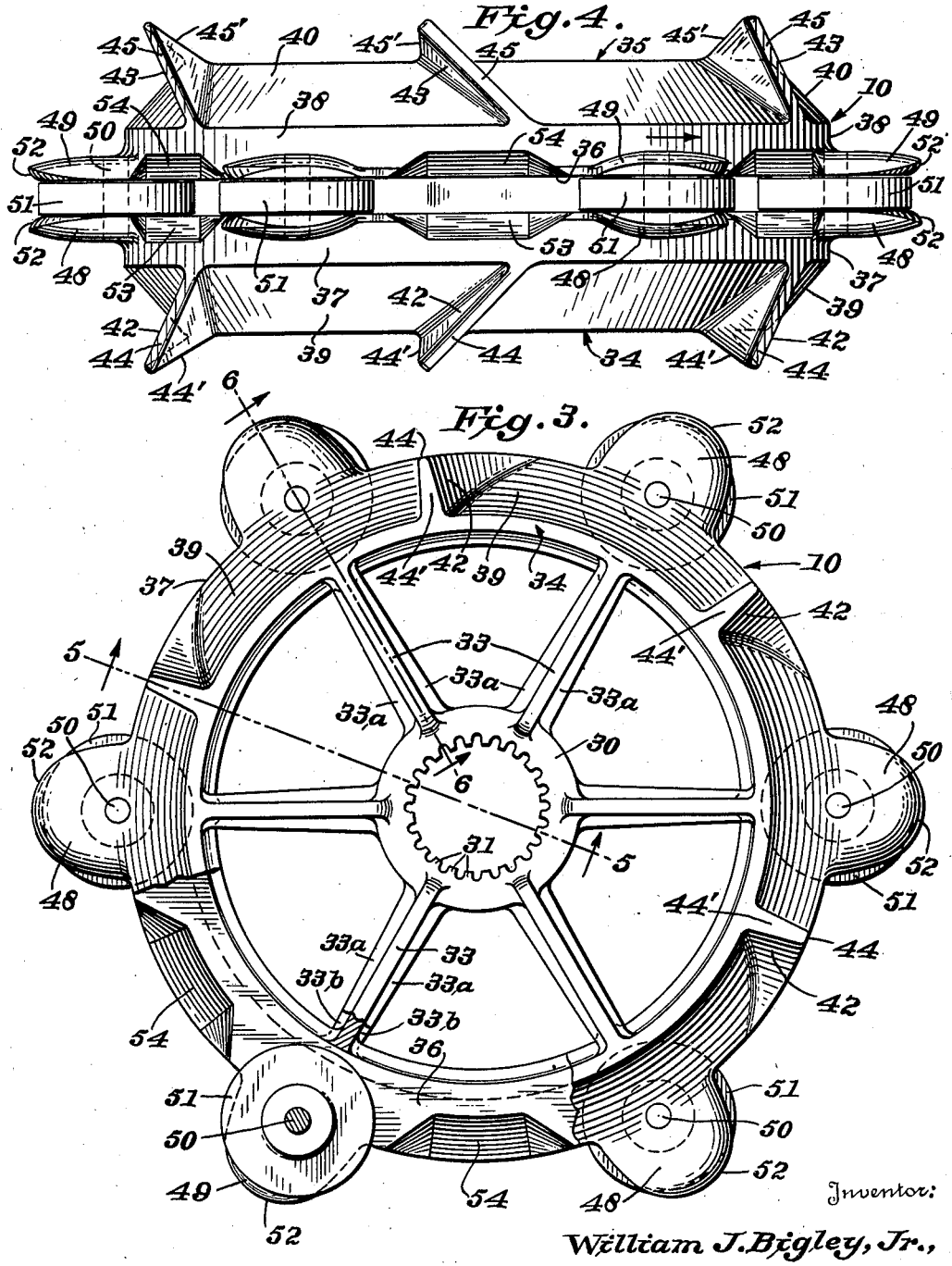

April 13, 1943. W. J. BIGLEY, JR 2,316,662
TANK
Filed Dec. 31, 1941 3 Sheets-Sheet 3
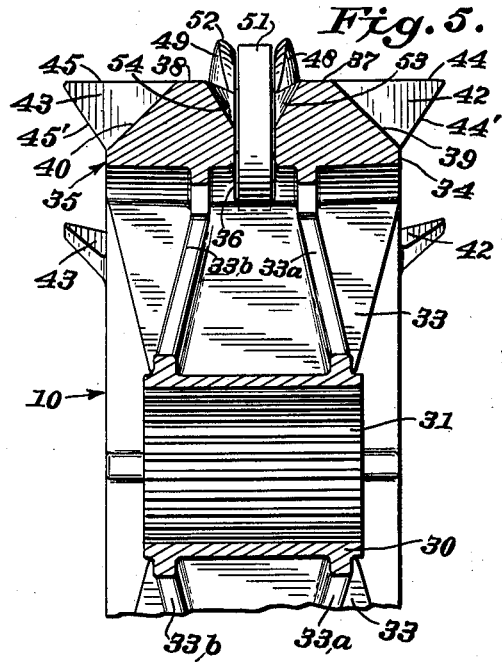
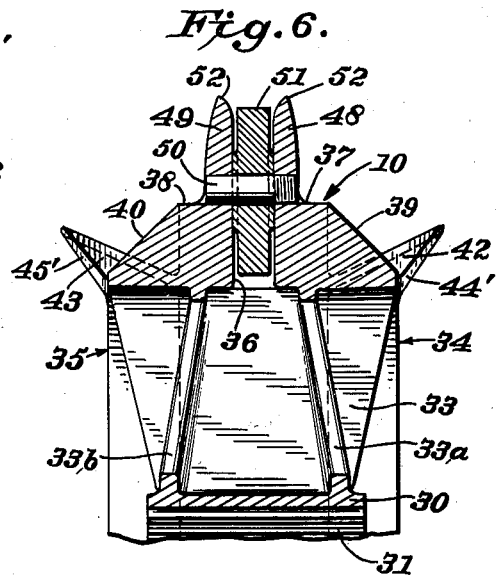
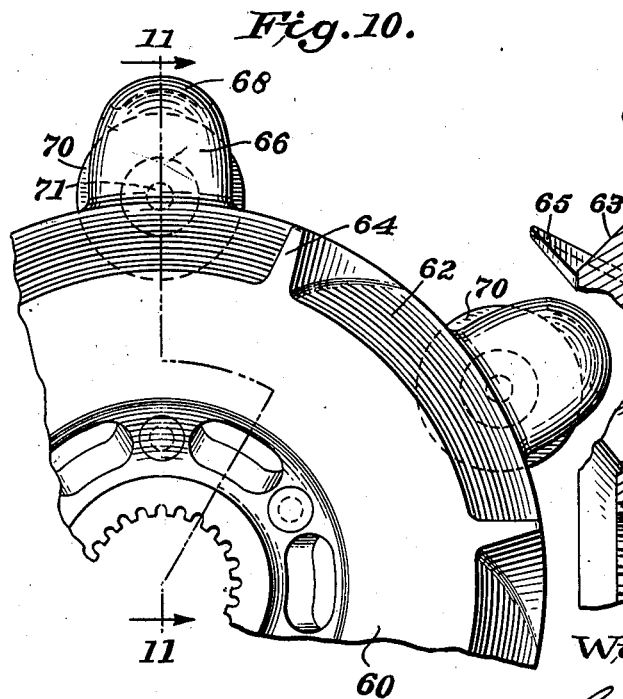
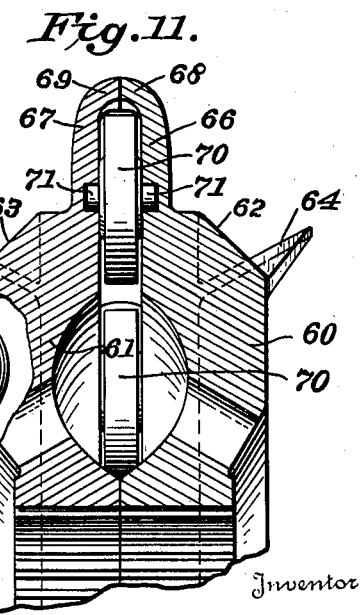
Inventor:
William J. Bigley, Jr.

Patented Apr. 13, 1943

2,316,662

UNITED STATES PATENT OFFICE 2,316,662

TANK

William J. Bigley, Jr., Weehawken, N. J.

Application December 31, 1941, Serial No. 425,216

16 Claims. (Cl. 305—9)

The present invention relates to new and improved tank or tractor structures, and more particularly, to improvements in the tracks and wheels or sprockets therefor.

A primary object of the invention is to provide a track and sprocket constructions that will have longer lives and better wearing properties than corresponding devices of the prior art.

Another object of paramount importance is to provide a track and sprocket construction capable of operation at extremely high-speeds, without any danger of break down or damage to the structure or to the occupants of the vehicle. Tanks equipped with devices of the present invention have been operated satisfactorily, during tests under extremely adverse conditions, at speeds well in excess of sixty miles per hour.

A further object of the invention is to provide a track and sprocket construction that will not be damaged or become clogged or jammed by dirt, mud, stones, shell fragments or other foreign objects during use. To this end, the invention provides novel structural features in the sprocket and track which make them self-clearing, so that it is virtually impossible for foreign substances or objects to become clogged or jammed between the track sections and the sprocket.

A further object of the invention is to provide novel guiding means associated with the track and sprocket, to prevent the track from becoming dislodged or accidentally removed from its normal, trained relation about the sprocket wheel and other wheels of the vehicle.

A further object of the invention is to provide novel anti-friction devices associated with the sprocket wheel and track.

Still another object of the invention is to provide novel connecting means for the articulated links of the track and to provide improved means for preventing removal of the connecting means. To this end, the invention provides means for positively preventing removal of the track section connecting pins, even though the latter become broken intermediate their ends, yet permitting ready removal and replacement of the pins by an operator whenever desired, using simple, standard tools.

Other and further objects and advantages of the invention will be apparent to those skilled in the art, from a consideration of the following description of certain specific embodiments of the invention, shown in the accompanying drawings, in which:

Figure 1 is a somewhat diagrammatic side elevation of a tank of the type with which the present invention may be used;

Figure 2 is an elevation of a preferred form of sprocket wheel and articulated track;

Figure 3 is an enlarged elevation of the sprocket, with certain parts broken away and other parts shown in section;

Figure 4 is a top plan view of the sprocket wheel shown in Figure 3;

Figure 5 is a section substantially on line 5—5 of Figure 3;

Figure 6 is a section on line 6—6 of Figure 3;

Figure 7 is a plan view of the ground engaging surface of the tractor track;

Figure 8 is a similar fragmentary view, on an enlarged scale, with certain parts shown in section;

Figure 9 is a transverse section through the pin securing means shown in Figure 8;

Figure 10 is a fragmentary elevation of a slightly modified form of sprocket wheel, and Figure 11 is a section on line 11—11 of Figure 10.

Although not confined to such use, the sprocket of the present invention may be employed, as indicated at 10 in Figure 1, as the driving sprocket for a tank 11 having an armoured body 12, a gun turret 13, a plurality of independently sprung wheels 14, 15, 16, 17 and a guiding sprocket 18, about which the track 20 is trained. The wheels 14–17 are preferably provided with pairs of solid rubber tires, spaced apart to provide an annular guiding channel for the reception of fins associated with the track, as hereinafter explained. These wheels are preferably journalled on stub axles 21 carried by independently mounted bell crank levers 22 connected to links 23 having their ends connected to heavy coil springs housed in cylinders 25 mounted on the side walls of the tank between the inner wall thereof and an outer armoured skirt 29. Since the structures and arrangements of these parts are not claimed in this application, they are not shown in detail in the accompanying drawings and need not be described further.

Referring to Figures 3 and 4, the driving sprocket 10 comprises a hub 30 having a splined inner periphery 31 adapted to be mounted upon a correspondingly splined portion of the main drive shaft 32 of the vehicle. Spokes 33 radiate from the hub 30 and are connected, preferably integrally, at their outer ends to a circumferentially slotted rim comprising two annular members 34, 35.

The rim on both sides of the slot 36 is shaped to provide relatively narrow cylindrical surfaces 37, 38 and radially inwardly and laterally inclined surfaces 39, 40, similar to truncated cones and extending from the central circumferential area to the side edge faces of the rim. Preferably, the inclination of the surfaces 39, 40 is substantially 45° from a plane normal to the wheel axis. These inclined surfaces are of importance, in preventing stones or other foreign bodies from becoming jammed between the sprocket and the adjacent faces of the track sections, as explained below.

The sprocket wheel also comprises a plurality of wings 42, 43 projecting radially outwardly from the inclined surfaces 39, 40 in circumferentially spaced relation, with their outer edges 44, 45 disposed in alignment with the central circumferential portions 37, 38, or, in other words, substantially on an axial projection of the radially outermost edges of the inclined surfaces 39, 40. Also, the wings 42, 43 are preferably inclined rearwardly with respect to the normal direction of rotation of the sprocket and are disposed in equal angular relation to a central plane normal to the wheel axis.

These wings perform an important dual function, in that they provide lateral support for certain of the track links, as hereinafter explained, and act as chopping blades to dislodge dirt, mud, stones or other foreign bodies that tend to collect on the adjacent surface of the track links.

The wings 42, 43 preferably comprise triangular elements which may be integral with the rim or secured thereto as by welding. As indicated in Figures 4–6, they have inclined inner edges 44', 45' and extend, as a whole, beyond the side faces of the rim. The spokes 33 preferably have associated therewith, strengthening or stiffening ribs 33a, 33b and are preferably formed integrally with the rim and hub, to provide a sturdy, rigid, unitary structure.

The rim sections 34, 35 further comprise a plurality of substantially radially projecting bosses 48, 49, arranged in pairs on opposite sides of the slot 36 and spaced circumferentially around the rim, between the pairs of wings 42, 43. Each pair of bosses is apertured for the reception of a stub axle or pin 50, upon which an anti-friction roller 51 is journalled. Preferably, the bosses extend outwardly as at 52 beyond the periphery of the rollers, but are narrower than the rollers to expose the latter at areas adjacent the periphery of the sprocket.

It should be noted that the slot 36 between the two rim sections is laterally enlarged at the spaces between the pairs of outwardly projecting bosses 48, 49, by bevelling the inner walls of the rim sections as at 53, 54, in order to more readily receive the guiding fins on the track, as hereinafter explained.

Instead of having independent spokes, the sprocket may be constructed as shown in Figures 10 and 11. In this construction, a pair of discs 60, 61 are stamped, pressed, forged or cast from suitable steel, such as armour plate, to provide sections which may be bolted or otherwise secured together and mounted on the splined drive shaft as explained above. This procedure eliminates the spokes 33 and facilitates the manufacturing operations. As explained above, the periphery of the wheel is preferably inclined as at 62, 63 and is provided with outwardly and laterally projecting wings 64, 65, functioning in the same manner.

The bosses 66, 67 are preferably turned inwardly at their outer ends, as at 68, 69, to house the outer ends of the rollers. The rollers 70 may be provided with laterally projecting trunnions 71 received in sockets in the bosses, or stub axles or pins may be secured therein, upon which the rollers are journalled. The rollers and their supports are preferably assembled when the two discs 60, 61 are brought together, thereby providing a simple mounting means for the rollers and one that can be removed only by separation of the wheel sections.

Referring to Figures 2 and 7–9, the track of the present invention comprises a plurality of interconnected, articulated links arranged in a repeating cycle consisting of transversely elongated full width sections 75 and pairs of relatively narrow spaced apart sections 76, 77, the latter sections leaving central apertures 78. The sections 75 are provided with a plurality of sets of relatively narrow, forwardly and rearwardly projecting apertured bosses 79, 79' on their corresponding front and rear edges. Also, they have centrally positioned, relatively wide forwardly and rearwardly projecting apertured bosses 80, 81. Each of the narrow intermediate sections 77, 76 has a set of forwardly and rearwardly projecting bosses 82, 83, staggered with respect to the bosses on the sections 75 and disposed adjacent thereto in the spaces therebetween. The sections are interconnected by hinge pins 84 extending through the apertures in the respective bosses, as indicated in Figure 8. Preferably, each pin extends entirely across the track and has its end faces disposed within the aperture 85 in the outermost bosses 82—82, 83—83 carried by the narrow track sections 76, 77. Each of the bores in these end bosses is provided with an annular enlargement or groove 86, in which a circular or G-shaped expansible spring clip 87 is disposed. The spring clips are held firmly in the groove 86S by their resilient expanding tendency and, in Figures 8 and 9, the clips are shown in somewhat contracted position, so that they constantly exert an expanding force against the bottoms of the grooves. The clips are disposed in abutting relation to the end faces of the pins 84, to prevent endwise movement thereof. Hence, even if the pins should be broken intermediate their ends, they would not be dislodged from operative position in the bores, and they would still perform their connecting function and the endless track, as a whole, would not be broken.

Each full width track section 75 has formed on its upper or inner surface a longitudinally arranged upwardly projecting fin 88, merging at its front and rear ends with the central bosses 80, 81. The fins are preferably generally triangular in outline, as shown in Figure 2, and have edges 89, 90 aligned with and adapted to engage the rollers 51 carried by the sprocket, as the fins approach the sprocket periphery and enter the groove 36. The lateral enlargement of the groove and the bevelled surfaces 53, 54 serve to guide the fins into the slot and prevent the ends of the fins from jamming against the periphery of the rim, in case the track sections are tipped laterally a slight amount.

The laterally projecting wings 44, 45 are positioned opposite to the full width sections 75 and provide seats for those sections as well, as preventing lateral tipping thereof, as the track moves around with the sprocket.

The bosses 48, 49 and the rollers 51 enter the apertures 78 and engage bosses 80, 81 in driving relation, the latter acting as bearing surfaces for the rollers.

By reason of the inclined peripheral surfaces 39, 40 and the relatively thin, sharp configuration of the wings 42, 43, any foreign substances that might tend to pack between the sprocket and the inner faces of the track sections are effectively sub-divided and positively squeezed laterally and dislodged by a wedging action of enormous force. The peripheral slot 36, being open at its inner and outer margins, is also self-clearing and any obstructions that might tend to become lodged therein are forced inwardly through the bottom of the slot by the fins 88.

The track sections 75, 76, 77 are preferably cast or forged from hard, nickel-chrome steel and the fins 88 are preferably formed integrally with the sections 75, by forging or casting. The pins 84 are made of similar material and, in actual practice, it has been demonstrated that, with the construction shown herein, no lubrication of the parts is required, even for extended usage.

If one or more links of the chain become damaged, it is an extremely simple matter to replace the same by the removal of the necessary spring clips 87 and by driving out the connecting pins 84. Thus, the spring clips 87 have numerous advantages and perform unexpected functions when employed in the manner shown herein. First, they prevent endwise removal of the pins in the event that the pins become broken in use. Second, they are relatively inaccessible and are completely protected from mutilation or damage by the enclosing bosses in which they are housed. Third, they may be readily removed by the use of a simple tool in the hands of a mechanic or soldier, for replacement of a pin or track section. Finally, they may be replaced with equal facility, so that repairs to the track can be made in the field with little or no trouble.

Although the wheel of the present invention has been shown and described as a driving sprocket wheel for tanks, it must be understood that with obvious modifications, it may be employed as a vehicle supporting wheel, riding on an endless tractor track. In such case, the bosses 48, 49 and the rollers 51 are eliminated or the amount of their radial projection reduced, so that they will not engage the ground. The self-clearing features of the wheel of the present invention, therefore, have wider application than merely in use as a driving sprocket. Obviously, the features of the invention may be, and preferably are, embodied in the front guiding sprocket 18 (Fig. 1), about which the track is trained.

It must be understood that the invention is not limited to the specific details of construction shown in the accompanying drawings and described above, but covers all modifications coming within the scope of the appended claims and their equivalents.

I claim:

1. A wheel for the articulated track of a track laying tank or tractor, comprising a rim portion having its periphery inclined inwardly toward the wheel axis and laterally toward the side edge of the rim portion substantially continuously around the wheel except at circumferentially spaced points, and a plurality of circumferentially spaced wings at said points projecting outwardly from said inclined surface and having their outer edges lying substantially on an axial projection of the radially outer edge of the inclined surface.

2. A wheel for the articulated track of a track laying tank or tractor, comprising a rim having its perpihery inclined from a substantially central, circumferential area on both sides thereof, inwardly toward the wheel axis and laterally to both side edges of the rim substantially continuously around the wheel except at circumferentially spaced points, and a plurality of wings at said points projecting outwardly from said inclined surfaces and having their outer edges lying substantially on axial projections of said central circumferential area.

3. A wheel for the articulated track of a track laying tank or tractor, comprising a rim having its peripheral face inclined from a substantially central, circumferential area on both sides thereof, inwardly toward the wheel axis and laterally to both side edges of the rim continuously around the wheel except at circumferentially spaced points, and a plurality of substantially triangular wings at said points projecting radially outwardly from said inclined surfaces and having their outer edges lying substantially on axial projections of said central circumferential area.

4. A wheel for the articulated track of a track laying tank or tractor, comprising a rim having its peripheral face inclined from a substantially central circumferential area on both sides thereof inwardly toward the wheel axis and laterally to both side edges of the rim substantially continuously around the wheel except at circumferentially spaced points, and a plurality of wings projecting radially outwardly from said inclined face at said points on oblique angularly pitched lines relative to the wheel axis and having their outer edges lying substantially on axial projections of said central circumferential areas.

5. A wheel for the articulated track of a track laying tank or tractor, comprising a rim having its peripheal face inclined from a substantially central circumferential area on both sides thereof inwardly toward the wheel axis and laterally to both side edges of the rim continuously around the wheel except at circumferentially spaced points, and a plurality of wings arranged in pairs on opposite sides of the central area, projecting radially outwardly from said inclined surfaces at said points in equal oblique angular relation to a central plane normal to the wheel axis, and having their outer edges lying substantially on an axial projection of the radially outer circumference of the wheel.

6. A sprocket wheel for the articulated track of a track laying tank or tractor, comprising a rim having its peripheral face inclined from a substantially central circumferential area to the side edges of the rim, a plurality of circumferentially spaced, centrally arranged projections adapted to be received in openings in the track, and a plurality of pairs of wings projecting outwardly from the inclined surfaces, the outer edges of the wings being disposed substantially the same distance from the wheel axis as the radially outer edge of the inclined surfaces.

7. A sprocket wheel for the articulated track of a track laying tank or tractor, comprising a rim having its peripheral face inclined from a substantially central circumferential area to the side edges of the rim, a plurality of circumferentially spaced, centrally arranged projections adapted to be received in openings in the track, and a plurality of pairs of wings projecting outwardly from the inclined surfaces and spaced circumferentially between the projections, the outer edges of the wings being disposed substantially the same distance from the wheel axis as the radially outer edge of the inclined surfaces.

8. A sprocket wheel having its periphery inclined from a substantially central circumference, inwardly and laterally on both sides thereof, a plurality of pairs of circumferentially spaced outwardly projecting bosses, rollers carried by said bosses positioned to engage the links of a chain, and a plurality of pairs of substantially radially projecting wings on the inclined peripheral surfaces.

9. A sprocket wheel having its periphery inclined from a substantially central circumference, inwardly and laterally on both sides thereof, a plurality of pairs of circumferentially spaced outwardly projecting bosses, rollers carried by said bosses positioned to engage the links of a chain, and a plurality of pairs of substantially radially projecting wings on the inclined peripheral surfaces spaced circumferentially between the bosses.

10. A sprocket wheel having its periphery inclined from a substantially central, circumferentially slotted area inwardly and laterally on both sides thereof, a plurality of circumferentially spaced outwardly projecting bosses arranged in pairs on opposite sides of the slotted area at the radially outermost edges of the inclined periphery, and a plurality of wings projecting radially outwardly from said inclined surfaces and spaced circumferentially between the pairs of bosses.

11. A sprocket wheel having its periphery inclined from a central, circumferential area inwardly and laterally on both sides thereof, a plurality of circumferentially spaced outwardly projecting bosses arranged in pairs adjacent said central area, the wheel periphery being shaped to provide recesses spaced circumferentially between the pairs of bosses, and a plurality of wings projecting radially outwardly from said inclined surfaces and spaced circumferentially between the bosses and in alignment with the recesses.

12. A sprocket wheel having a circumferential slot in its rim, peripheral rim surfaces on both sides of the slot inclined inwardly toward the wheel axis and laterally away from the slot, a plurality of circumferentially spaced outwardly projecting bosses arranged in pairs on opposite sides of the slot, rollers carried by the bosses and disposed at least partially in said slot, and wings projecting radially outwardly from the inclined surfaces and spaced circumferentially between the pairs of bosses.

13. In combination, an articulated tractor track and a driving sprocket wheel therefor, said sprocket wheel having its periphery inclined inwardly and laterally from a central circumferential slot, a plurality of circumferentially spaced outwardly projecting bosses arranged in pairs on opposite sides of the slot, rollers carried by the pairs of bosses, and wings projecting radially outwardly from the inclined surfaces and spaced circumferentially between the pairs of bosses, said track comprising sections having inwardly projecting guiding fins adapted to be received in the slot between the wings and alternate sections providing openings for the reception of said rollers and bosses.

14. In combination, an articulated tractor track and a driving sprocket wheel therefor, said sprocket wheel having its periphery inclined inwardly and laterally from a central circumferential slot, a plurality of circumferentially spaced outwardly projecting bosses arranged in pairs on opposite sides of the slot, rollers carried by the pairs of bosses, and wings projecting radially outwardly from the inclined surfaces and spaced circumferentially between the pairs of bosses, said track comprising alternate sections having inwardly projecting longitudinally disposed fins adapted to be received in said slot and having end faces positioned to engage the sprocket rollers, and alternate sections providing openings for the reception of the bosses and rollers.

15. In combination, an articulated tractor track and a driving sprocket wheel therefor, said sprocket wheel having its periphery inclined inwardly and laterally from a central circumferential slot, a plurality of circumferentially spaced outwardly projecting bosses arranged in pairs on opposite sides of the slot, rollers carried by the pairs of bosses, and wings projecting radially outwardly from the inclined surfaces and spaced circumferentially between the pairs of bosses, said track comprising, alternately, full width links and pairs of narrow transversely spaced apart links providing apertures for the reception of the bosses and rollers on the sprocket, the full width links having upwardly projecting longitudinally arranged guiding fins adapted to be received in the slot in the sprocket and to engage the sprocket rollers, the wings on the sprocket being aligned with the full width single links to prevent substantial lateral tipping thereof.

16. In combination, an articulated tractor track and a driving sprocket wheel therefor, said sprocket wheel having its periphery inclined inwardly and laterally from a central circumferential area, a plurality of circumferentially spaced bosses projecting outwardly from said wheel, and a plurality of wings projecting radially outwardly from the inclined surfaces and spaced apart circumferentially thereof, said track comprising, alternately, full width links and pairs of narrow transversely spaced apart links providing apertures for the reception of the bosses on the sprocket, the full width links being aligned with the wings on the sprocket and being restrained against substantial lateral tipping thereby.

WILLIAM J. BIGLEY, Jr.